US008700258B2

(12) United States Patent
Tate, Jr. et al.

(10) Patent No.: US 8,700,258 B2
(45) Date of Patent: Apr. 15, 2014

(54) PARK ASSIST SYSTEM

(75) Inventors: Edward D. Tate, Jr., Grand Blanc, MI (US); Alan G. Holmes, Clarkston, MI (US); Hsiu-Pang Chan, Oshawa (CA); Donald Eng, Markham (CA); Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/611,667

(22) Filed: Sep. 12, 2012

(65) Prior Publication Data

US 2014/0074352 A1  Mar. 13, 2014

(51) Int. Cl.
*G06F 7/00* (2006.01)
*B60Q 1/00* (2006.01)
*G08G 1/16* (2006.01)

(52) U.S. Cl.
USPC ............... 701/36; 701/42; 340/435; 340/475; 340/903

(58) Field of Classification Search
USPC ................... 701/36, 37; 340/435, 475, 903
See application file for complete search history.

(56) References Cited

U.S. PATENT DOCUMENTS

| | | | | |
|---|---|---|---|---|
| 6,925,370 | B2 * | 8/2005 | Smith et al. | 701/36 |
| 8,134,479 | B2 * | 3/2012 | Suhr et al. | 340/932.2 |
| 8,198,996 | B2 * | 6/2012 | Golomb | 340/475 |
| 8,436,747 | B2 * | 5/2013 | Schoepp | 340/903 |
| 2007/0244641 | A1 * | 10/2007 | Altan et al. | 701/300 |
| 2010/0152972 | A1 * | 6/2010 | Attard et al. | 701/42 |
| 2013/0057397 | A1 * | 3/2013 | Cutler et al. | 340/435 |
| 2013/0176329 | A1 * | 7/2013 | Toyoda et al. | 345/593 |

* cited by examiner

*Primary Examiner* — Thomas Black
*Assistant Examiner* — Tyler Paige
(74) *Attorney, Agent, or Firm* — Cantor Colburn LLP

(57) ABSTRACT

A park assist system for providing guidance to park a vehicle into a parking area is disclosed. The park assist system includes an imaging device, at least one indicator, and a control module. The imaging device acquires image data representative of a field of view (FOV). The indicator provides feedback to guide the vehicle into the parking area. The control module is in communication with the imaging device and the at least one indicator. The control module includes control logic for monitoring image data representative of the viewable area. The control module includes control logic for determining if a specific predetermined object is located within the FOV. The specific predetermined object indicates the presence of the parking area. The control module includes control logic for activating the at least one indicator to provide feedback regarding the parking area.

6 Claims, 3 Drawing Sheets

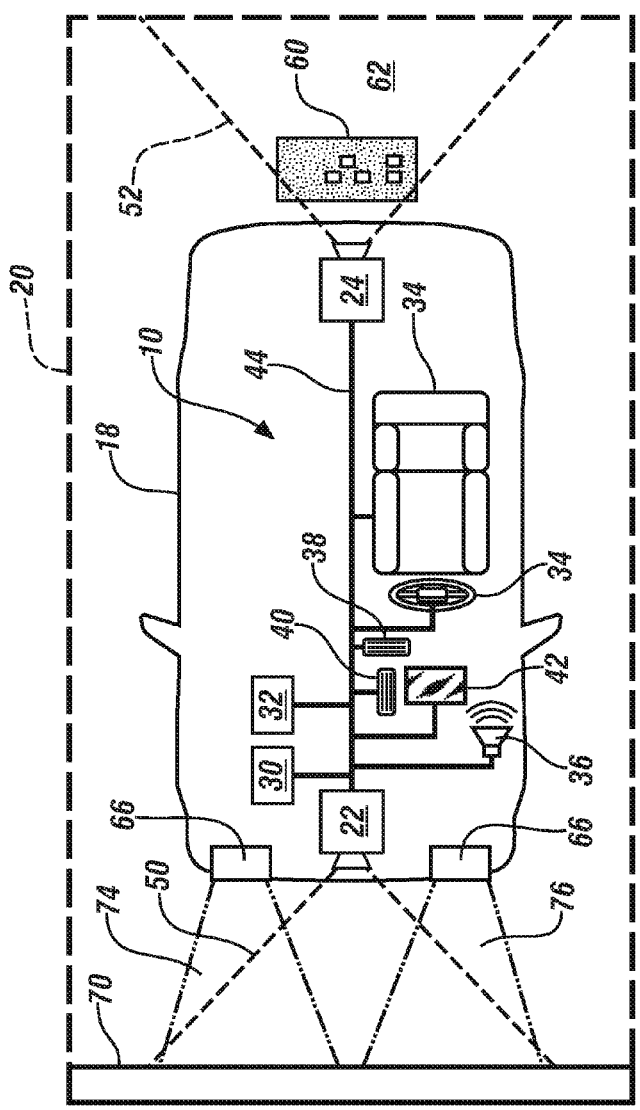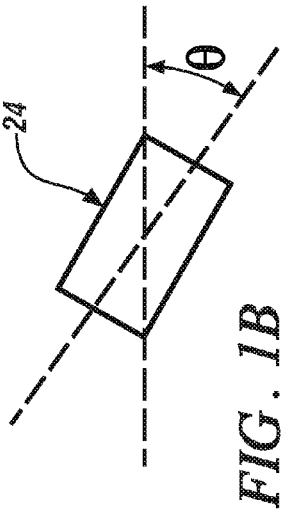
FIG. 1A
FIG. 1B

PARK ASSIST SYSTEM

FIELD OF THE INVENTION

Exemplary embodiments of the invention relate to a park assist system for a vehicle and, more particularly, to a park assist system for providing guidance into a parking area if a specific predetermined object is detected by an imaging device.

BACKGROUND

Parking in relatively small garage or parking spaces may be challenging for some individuals. Incorrectly parking a vehicle in a confined garage space may result in damage to the vehicle body (e.g., caused by a garage door, another vehicle, or another obstruction). Park assist systems are used to indicate obstacles located in front of or behind a vehicle during parking. For example, some types of park assist systems include an imaging device such as a camera that is mounted to a front portion or a rear portion of the vehicle. The camera acquires image data that represents a viewable area either in front of or behind the vehicle. The park assist system may then provide feedback to the driver to indicate how to maneuver the vehicle into a garage or parking space.

It may also be challenging to park a vehicle in the event a wireless power transfer device (e.g., an inductive charger) is involved. Specifically, it may be relatively difficult for a driver to align the vehicle with a charging pad, especially if the charging pad is located underground and is not visible. Accordingly, it is desirable to provide an improved park assist system which exhibits improved performance from the standpoint of ease of use and convenience to a driver.

SUMMARY OF THE INVENTION

In one exemplary embodiment of the invention, a park assist system for providing guidance to park a vehicle into a parking area is disclosed. The park assist system includes an imaging device, at least one indicator, and a control module. The imaging device acquires image data representative of a field of view (FOV). The indicator provides feedback to guide the vehicle into the parking area. The control module is in communication with the imaging device and the at least one indicator. The control module includes control logic for monitoring image data representative of the viewable area. The control module includes control logic for determining if a specific predetermined object is located within the FOV. The specific predetermined object indicates the presence of the parking area. The control module includes control logic for activating the at least one indicator to provide feedback regarding the parking area.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which:

FIG. 1A is an illustration of an exemplary park assist system in a vehicle;

FIG. 1B is an illustration of a rear camera shown in FIG. 1A;

DESCRIPTION OF THE EMBODIMENTS

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 4A:
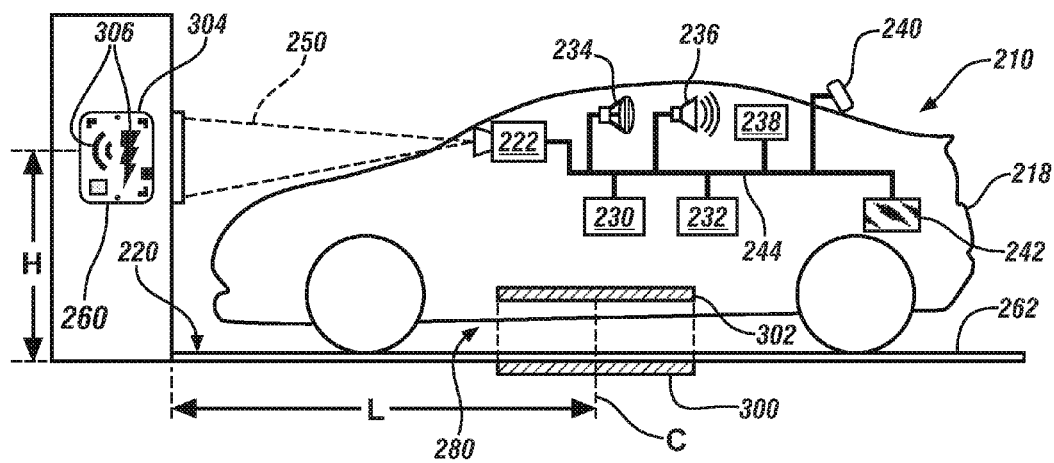
FIG. 4A is an alternative embodiment of the park assist system.

Referring now to FIG. 1A, an exemplary embodiment is directed to a park assist system 10 that is part of a vehicle 18. The park assist system 10 is used to provide guidance to park the vehicle into a parking area 20. The park assist system 10 may include at least one imaging device such as, for example, a front camera 22 or a rear camera 24. In the embodiment as shown, the front camera 22 and the rear camera 24 are part of a monocular vision system (e.g., a single camera is used to acquire a viewable area), however it is to be understood that a stereo vision camera system (e.g., having multiple cameras to acquire a viewable area) may be used as well. The park assist system 10 may also include a park assist control module 30, a positioning system control module 32, a haptic device 34 (which is illustrated as a steering wheel), a speaker 36, an accelerator pedal 38, a brake pedal 40, and a display device 42, which are in communication with one another through a vehicle bus 44. The parking area 20 may be, for example, a predetermined position in a parking garage or a parking lot. In another embodiment, the parking area 20 may include a wireless power transfer device (e.g., an inductive charger), which is illustrated in FIG. 4A.

The park assist system 10 is used to guide the vehicle 18 into the parking area 20. In one embodiment, the park assist system 10 may be a manual park assist system that provides indicators to provide guidance to a driver to park the vehicle in the parking area 20. For example, the park assist system 10 may provide a visual aid on the display 42 for assisting a driver to park the vehicle 18. The park assist system 10 may also provide an audio indicator though the speaker 36. The park assist system 10 may also provide a haptic feedback through the haptic device 34. For example, the park assist system 10 may create a vibration in the steering wheel. Alternatively, in another embodiment, the haptic device 34 may be a driver's seat which may vibrate on either a left or right side to provide guidance to a driver. In another embodiment, the accelerator pedal 38 and the brake pedal 40 may be calibrated to guide a driver into the parking area 20. Specifically, the accelerator pedal 38 may be modulated or controlled to reduce the throttle position as the vehicle 18 approaches the parking area 20 (e.g., to simulate a sensation where a driver feels as though the vehicle 18 is situated on a graded or sloped surface, and urges or guides the vehicle 18 into the parking area 20).

In an alternative embodiment, the park assist system 10 may be an automatic park assist system. That is, the park assist system 10 may control the steering wheel 34, the accelerator pedal 38, and the brake pedal 40 to automatically park the vehicle 18 into the parking area 20.

The front camera 22 acquires image data regarding a front viewable area or field of view (FOV) 50. The rear camera 24 acquires image data regarding a rear viewable area or FOV 52. As shown in FIG. 1B, the rear camera 24 may be positioned at an angle θ. In one embodiment, the angle θ may range from about 30 degrees to about 45 degrees, however it is to be understood that other angles may be used as well. It should also be noted that the front camera 22 may also be positioned at a relatively slight angle as well (e.g., ranging from about 5 degrees to about 10 degrees).

The positioning system control module 32 may be any type of control module that is part of a system for determining a specific geographical location of the vehicle 18. For example, in one embodiment, the positioning system control module 32 may be part of a dedicated short-range communication system (DSCS). Specifically, the positioning system control module 32 may exchange through secure communication information regarding the position of the vehicle 18. In another embodiment, the positioning system control module 32 may be a global positioning satellite ("GPS") receiver that is in communication with a satellite (not shown) for providing information regarding the location of the vehicle 18.

The park assist control module 30 includes control logic for monitoring the front camera 22 and the rear camera 24. Specifically, the park assist control module 30 receives image data from the front camera 22 regarding the front FOV 50 and from the rear camera 24 regarding the rear FOV 52. The park assist control module 30 includes image processing control logic to determine if a specific predetermined object 60 is located in either the front FOV 50 or the rear FOV 52. The specific predetermined object 60 indicates the presence of the parking area 20, and also provides guidance for determining the location of the vehicle 18 with respect to the parking space 20.

In the exemplary embodiment as shown in FIG. 1, the specific predetermined object 60 is a decal or sticker that is placed on a ground surface 62 that is recognizable by either the front camera 22 or the rear camera 24. The decal or sticker 60 may have a solid color (e.g., the sticker could be green, for example). Alternatively, in another approach, the sticker 60 may be an image that may be decoded to include specific information. For example, in one embodiment the image may be a quick response code ("QR code") that is readable by either the front camera 22 or the rear camera 24. The image may convey any type of information that would aid a driver in parking the vehicle 18 into the parking area 20 such as, for example, locational information or a specific parking area allocated to a specific driver. Specifically, for example, in a parking lot having multiple parking spaces the image indicates if a specific parking space is associated with a specific driver, where each parking space is associated with a different driver. In one embodiment, the image may indicate information regarding a charging level of a charging pad, the commercial source of power (e.g., Detroit Edison), or the source of power (e.g., if the power is created by a windmill or is solar powered). In another embodiment, the specific predetermined object 60 may be markings or indicators (not shown) located on the ground surface 62 that indicates an inductive charging pad is located underneath the ground surface 62. Alternatively, in another embodiment, the specific predetermined object 60 may be a charging pad (not shown) that is positioned along the ground surface 62 that is recognizable by either the front camera 22 or the rear camera 24. In the embodiment as shown in FIG. 4A, the specific predetermined object 60 may be a sign 304, which is described in greater detail below.

Figure 2A:
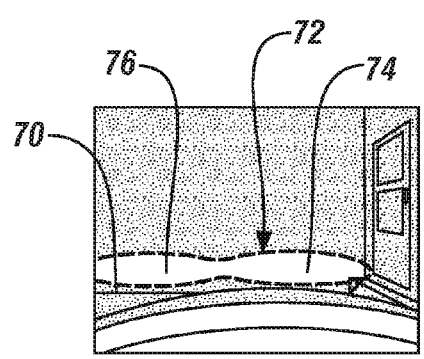
FIGS. 2A-2C are an illustration of lighting patterns from a set of vehicle headlights located on the vehicle shown in FIG. 1A.
Figure 2B:
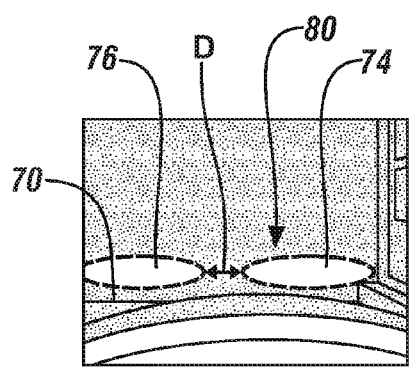
Figure 2C:
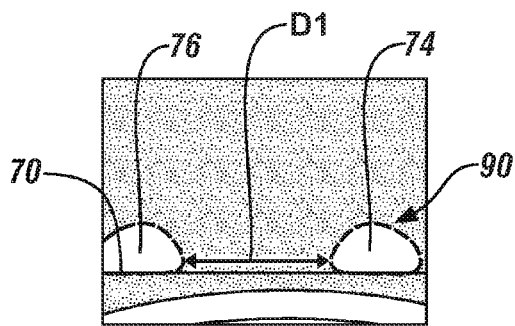

In yet another embodiment, the specific predetermined object 60 could be a pattern created by a set of headlights 66 being reflected on a surface such as, for example, a wall. In one embodiment, if the headlights 66 are not activated as the vehicle 18 pulls into the parking area 20 (e.g., a dark parking garage), the park assist control module 30 may include control logic for activating the headlights 66 based on the specific geographical location of the vehicle 18. FIGS. 2A-2C are an illustration of the headlights 66 (shown in FIG. 1) being reflected on a wall 70. The lighting patterns of the headlights 66 change as the vehicle 18 (shown in FIG. 1) approaches the wall 70. For example, FIG. 2A is an illustration of a lighting pattern 72, where the vehicle 18 is positioned relatively close to the wall 70. As seen in FIG. 2A, a right beam 74 and a left beam 76 touch or are connected to one another. Turning now to FIG. 2B, a lighting pattern 80 is illustrated, where the vehicle 18 is positioned at a desired or intended distance from the wall 70. As seen in FIG. 2B, the right beam 74 and the left beam 76 are positioned at a predetermined distance D from one another. Turning now to FIG. 2C, a lighting pattern 90 is illustrated, where the vehicle 18 is positioned relatively far away from the wall 70. As seen in FIG. 2C, the right beam 74 and the left beam 76 are positioned at a distance D1 from one another. Referring to both FIG. 2B-2C, the predetermined distance D is less than the predetermined distance D1. The park assist control module 30 includes control logic for recognizing the distance between the right beam 74 and the left beam 76, and determining the position of the vehicle 18 relative to the wall 70 based on the distance between the right beam 74 and the left beam 76. It should be noted that while that headlights 66 shown in FIG. 1 are front headlights, rear taillights may be used as well.

Turning back to FIG. 1, the park assist control module 30 includes control logic for initiating a learning or training mode. During the learning mode, the park assist control module 30 determines and stores key aspects of the location of the predetermined object 60 during a park event. Specifically, as the vehicle is being parked, the training mode may be activated manually by a user (e.g., a user may press a button or select a menu shown on the display 42 to activate the training mode). Alternatively, in another embodiment, the park assist control module 30 may be continuously recording data during a drive cycle. The park assist control module 30 stores a portion of the data at the end of the drive cycle (e.g., during a park event) if the vehicle 18 is turned to a key-off or ignition-off state after the drive cycle, and remains in the ignition-off state for a predetermined amount of time.

In one embodiment, the park assist control module 30 stores the specific geographical location of the vehicle 18 (determined by the positioning system control module 32) during the training mode. For example, if the specific geographical location is a garage of a driver's residence, then the park assist control module 30 may store the driver's residence in a memory of the park assist control module 30 (e.g., under a location such as "Home—Garage"). The park assist control module 30 also stores the location of the predetermined object 60 within either the front FOV 50 or the rear FOV 52 during the training mode. The location of the predetermined object 60 within the front FOV 50 or the rear FOV 52 is referred to as an ideal or standard parking location. In one embodiment, the park assist control module 30 may store information regarding the position of the decal or sticker 60 within either the front FOV 50 or the rear FOV 52 to indicate the standard parking location. In another embodiment, the park assist control module 30 may store information regarding the position of indicators (not shown) located on the ground surface 62 that indicate an indicative charging pad is located underneath the ground surface 62 within the front FOV 50 or the rear FOV 52 to indicate the standard parking location. In another embodiment, the park assist control module 30 may store information regarding the pattern created by the headlights 66 being reflected on the wall 70 in the front FOV 50 (the rear FOV 52 may be used as well for rear taillights) to indicate the standard parking location.

The park assist controller 30 includes control logic for providing guidance to park the vehicle 18 within the parking area 20 after the training mode has been completed (e.g., during a subsequent parking event in the same parking location). For example, the park assist control module 30 may receive a notification from the positioning system control module 32 (e.g., through the vehicle bus 44) indicating the vehicle 18 is within a specified proximity of the specific geographical location (e.g., the vehicle 18 is approaching the driver's place of residence, which is stored in the memory of the park assist control module 30 as "Home—Garage"). Once the park assist control module 30 determines that the vehicle 18 is within the specified proximity of the specific geographical location, then the park assist control module 30 may monitor the vehicle bus 44 to receive a vehicle speed signal. If the vehicle speed signal is less than a threshold value (e.g., generally below about 8 kph or 5 mph), this is an indication that the vehicle 18 may be travelling slowly enough to be parked.

The park assist control module 30 includes control logic for activating either the front camera 22 to view the front FOV 50, or the rear camera 24 to view the rear FOV 52. The park assist control module 30 receives image data from the front camera 22 or the rear camera 24 regarding the front FOV 50 regarding at least one specific predetermined object 60 (e.g., a sticker, markings located on the ground surface 62 that indicate an indicative charging pad is located underneath the ground surface 62, or lighting patterns of the headlights 66) located in either the front FOV 50 or the rear FOV 52. The park assist control module 30 then compares the position of the specific predetermined object 60 currently located within the front FOV 50 or the rear FOV 52 with the standard parking location (e.g., the location of the predetermined object 60 within either the front FOV 50 or the rear FOV 52 that is stored during the training mode). The park assist control module 30 then determines the current position of the vehicle 18 relative to the standard parking location. The park assist control module 30 may then activate at least one indicator to provide guidance to the driver to guide the vehicle 18 into the standard parking location. The indicator may be, for example, a visual aid on the display 42, an audio indicator transmitted though the speaker 36, haptic feedback through the haptic device 34, or modulation of the accelerator pedal 38 and the brake pedal 40.

Figure 3:
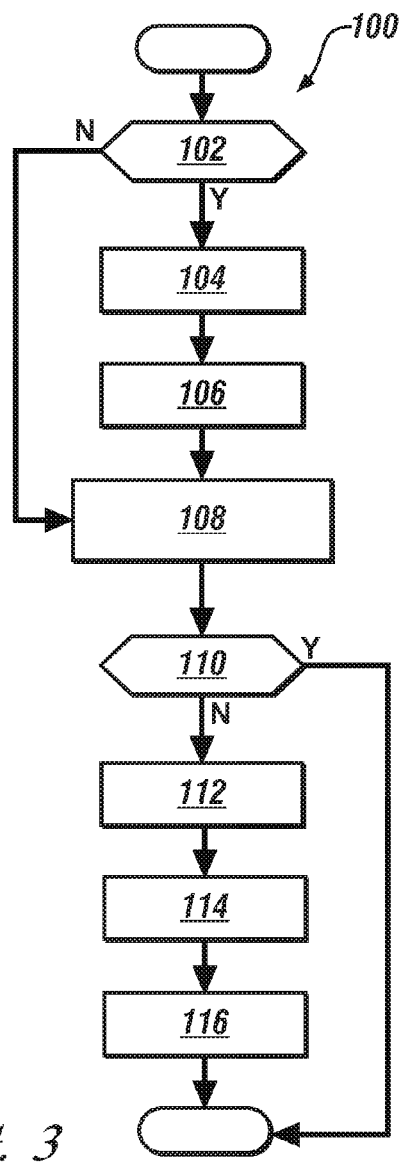
FIG. 3 is a process flow diagram illustrating one embodiment of operating the park assist system shown in FIG. 1A.

FIG. 3 is an exemplary process flow diagram illustrating a method 100 of providing guidance to park the vehicle 18 within the parking area 20 using the park assist system 10. Method 100 begins at step 102, where the park assist system 10 is operating in training mode. The training mode may be activated manually by a user. Alternatively, in another embodiment, the park assist control module 30 may be continuously recording data during a drive cycle, and stores a portion of the data at the end of the drive cycle (e.g., during a park event) if the vehicle 18 is turned to the ignition-off state. If the park assist system 10 is not operating in in training mode, then method 100 may proceed to step 108. If the park assist system 10 is operating in training mode, method 100 may then proceed to step 104.

In step 104, the park assist control module 30 stores the location of the predetermined object 60 within either the front FOV 50 or the rear FOV 52 during the training mode, which is referred to as the standard parking location. In one embodiment, the position of the decal or sticker 60 within either the front FOV 50 or the rear FOV 52 indicates the standard parking location. In another embodiment, indicators (not shown) located on the ground surface 62 indicate the standard parking location. In yet another embodiment, the pattern created by the headlights 66 being reflected on the wall 70 (shown in FIGS. 2A-2C) indicates the standard parking location. Method 100 may then proceed to step 106.

In step 106, the park assist control module 30 stores the specific geographical location of the vehicle 18 (determined by the positioning system control module 32) during the training mode. Method 100 may then proceed to step 108.

In step 108, the training mode has ended, and the vehicle 18 is now approaching the parking area 20. The park assist control module 30 may then receive an indication that the vehicle 18 is approaching one of the specific geographical locations stored in the memory of the park assist control module 30 from the positioning system control module 32. For example, if the vehicle 18 is approaching the specific geographical location that is a garage of a driver's residence (e.g., "Home—Garage"), then the park assist control module 30 receives an indication from the positioning system control module 32 through the vehicle bus 44 that the vehicle 18 is approaching the driver's garage. Method 100 may then proceed to step 110.

In step 110, the park assist control module 30 may then monitor the vehicle bus 44 to receive the vehicle speed signal. If the vehicle speed signal indicates that the vehicle 18 is travelling at a rate greater than the threshold value, method 100 may then terminate. However, if the vehicle 18 is travelling at a rate less than the threshold value, this is an indication that the vehicle 18 is travelling slowly enough to be approaching the parking area 20, and method 100 may then proceed to step 112.

In step 112, the park assist control module 30 monitors the front camera 22, the rear camera 24, or both. Specifically, the park assist control module 30 receives image data from the front camera 22 regarding the front FOV 50 and from the rear camera 24 regarding the rear FOV 52. Method 100 may then proceed to step 114.

In step 114, the park assist control module 30 compares the position of the specific predetermined object 60 currently located within the front FOV 50 or the rear FOV 52 with the standard parking location (e.g., the location of the predetermined object 60 within either the front FOV 52 or the rear FOV 52 that is stored during the training mode). Method 100 may then proceed to step 116.

In step 116, the park assist control module 30 determines the current position of the vehicle 18 relative to the standard parking location, and may activate at least one indicator to provide guidance to the driver to guide the vehicle 18 into the standard parking location. The indicator may be, for example, a visual aid on the display 42, an audio indicator transmitted though the speaker 36, haptic feedback through the haptic device 34, or modulation of the accelerator pedal 38 and the brake pedal 40. Method 100 may then terminate.

FIG. 4A is an alternative illustration of a park assist system 210 in a vehicle 218. The park assist system 210 includes a front camera 222, a park assist control module 230, a positioning system control module 232, a haptic device 234 (which is illustrated as a steering wheel), a speaker 236, an accelerator pedal 238, a brake pedal 240, and a display device 242, which are in communication with one another through a vehicle bus 244. In the embodiment as shown, the front camera 222 is part of a monocular vision system, however it is to be understood that a stereo vision camera system may be used as well.

In the embodiment as shown in FIG. 4A, a charging pad 300 is located underneath a ground surface 262 of a parking area 220, and aligns with a wireless receiver 302 located within the vehicle 218. It should be noted that while the charging pad 300 is located underneath the ground surface 262, the charging pad 300 may also be located above the ground surface 262 as well. A sign 304 is placed within proximity of the charging pad 300, and is located at a predetermined height H from the charging pad 300 and a predetermined length L from a center C of the charging pad 300.

Figure 4B:
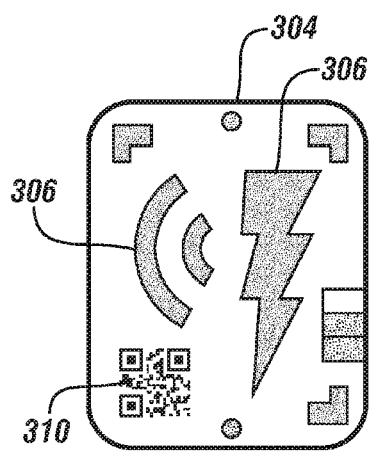
FIG. 4B is an illustration of a sign used in conjunction with the park assist system shown in FIG. 4A.

The sign 304 provides an indication that the charging pad 300 is located either underneath or above the ground surface 262. For example, in the embodiment as shown in FIGS. 4A-4B, the sign 304 includes at least one symbol 306 for indicating the presence of the charging pad 300. In the exemplary embodiment as shown, the symbols 306 are a lightning bolt and a set of arcuate lines, however, it is to be understood that other symbols may be used as well. The sign 304 may also provide charging information regarding the charging pad 300 as well. For example, in referring to FIG. 4B, an image 310 such as a QR code 310 is provided on the sign 304. The image 310 may indicate, for example, the charging level (e.g., the charging pad 300 is a 3.3 kW charger), the commercial source of power (e.g., Detroit Edison), or the source of power (e.g., if the power is created by a windmill or is solar powered). The image 310 may also indicate range and positional information regarding the position of the sign 304 relative to the charging pad 300 (e.g., the predetermined height H and the predetermined length L).

The park assist control module 230 receives image data from the front camera 222 regarding a front FOV 250. The park assist control module 230 includes image processing control logic to determine if a specific predetermined object 260 (e.g., the sign 304) is within the front FOV 250. Specifically, the park assist control module 230 includes control logic for recognizing the symbol 306 located on the sign 304, which indicates the presence of the charging pad 300. The park assist control module 230 also includes control logic for reading the image 310 located on the sign 304, and providing feedback to a user regarding information about the parking area 220. For example, the park assist control module 230 may then activate at least one indicator to provide information to the driver to regarding the parking area 220 (e.g., the charging level or source of power). The indicator may be, for example, a visual aid on the display 242 or an audio indicator transmitted though the speaker 236.

The park assist control module 230 also includes control logic for providing guidance to park the vehicle 218 within the parking area 220 based on range and positional information of the sign 304 relative to the charging pad 300. For example, the park assist control module 230 may provide guidance by activating at least one indicator to provide guidance to the driver to guide the vehicle 218 into the standard parking location (e.g., a visual aid on the display 242, an audio indicator transmitted though the speaker 236, haptic feedback through the haptic device 234, or modulation of the accelerator pedal 238 and the brake pedal 240). In one embodiment, the park assist control module 230 includes control logic for also calculating fore/aft distance and lateral positional information of the vehicle 218 relative to the charging pad 300. Specifically, the fore/aft distance and lateral positional information is determined by the position of the sign 304 relative to the charging pad 300 (e.g., the predetermined height H and the predetermined length L). Also, in another embodiment, guidance into the parking area 220 may be supplemented by the charging pad 300, where a relatively weak signal may be transferred from the charging pad 300 to the wireless receiver 302. The signal may indicate where the standard parking space (e.g., relative to the charging pad 300) is located. The park assist control module 230 may then provide feedback to the driver regarding the fore/aft distance and positional information via the display 242 or the speaker 236.

Once the vehicle 218 is parked within the parking area 220 and the charging pad 300 is generally aligned with the wireless receiver 302 of the vehicle 218, a safety check may be performed. Specifically, the safety check generally ensures that no physical obstructions (i.e., small animals, metal objects, etc.) are located between the charging pad 300 and the wireless receiver 302. For example, in one embodiment, an infrared sensor (not shown) may be positioned along an undercarriage 280 of the vehicle 218 for determining the presence of a small animal or other object. The presence or absence of an object may be communicated to the park assist control module 230 over the vehicle bus 244. In another approach, information regarding the power transfer efficiency between the charging pad 300 and the wireless receiver 302 may be communicated over the vehicle bus 244 to the park assist control module 230. The park assist control module 230 includes control logic for activating an alert if an obstruction is detected (e.g., an alert visual aid on the display 242 or an audio alert transmitted though the speaker 236).

Figure 5:
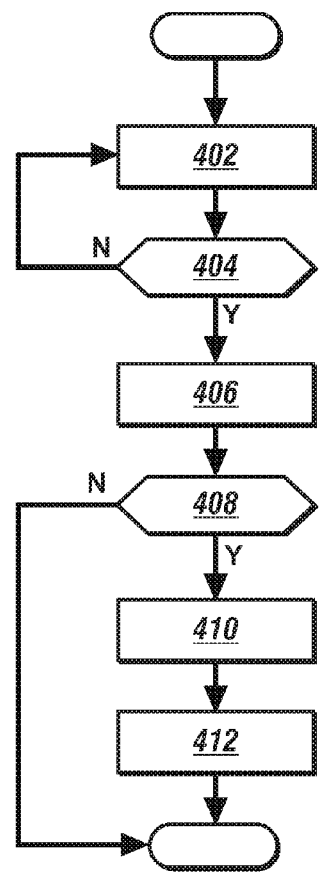
FIG. 5 is a process flow diagram illustrating another embodiment of operating the park assist system shown in FIG. 4A.

FIG. 5 is an exemplary process flow diagram illustrating a method 400 of providing guidance to park the vehicle 218 within the parking area 220 using the park assist system 210. Method 400 begins at step 402, where park assist control module 230 receives image data from the front camera 222 regarding the front FOV 250. Method 400 may then proceed to step 404.

In step 404, the park assist control module 230 determine if the specific predetermined object 260 (e.g., the sign 304) is located within the front FOV 250. If the sign 304 is not located within the front FOV 250, method 400 may return to step 402. If the sign 304 is located within the front FOV, method 400 may then proceed to step 406.

In step 406, the park assist control module 230 recognizes the symbol 306 located on the sign 304, which indicates the presence of the charging pad 300. The park assist control module 230 also includes control logic for reading the image 310 located on the sign 304, and determining information regarding the parking area 220. Method 400 may then proceed to step 408.

In step 408, the park assist control module 230 provides feedback regarding information about the parking area 220 based on the image 310. For example, the park assist control module 230 may activate at least one indicator to provide information (e.g., the charging level or source of power) by providing a visual aid on the display 242 or an audio indicator transmitted though the speaker 236. In the event the driver decides to park in the parking area 220, and vehicle 218 is maneuvered towards the parking area 220, method 400 may then proceed to step 410. However, in the event the driver decides not to park in the parking area 220, the park assist control module 230 may store the information regarding the parking area 220 in the memory of the park assist control module 230 (with respect to the specific geographical location as determined by the positioning system control module 232). Method 400 may then terminate.

In step 410, the park assist control module 230 may provide guidance by activating at least one indicator to provide guidance to the driver to guide the vehicle 218 into the standard parking location (e.g., a visual aid on the display 242, an audio indicator transmitted though the speaker 236, haptic feedback through the haptic device 234, or modulation of the accelerator pedal 238 and the brake pedal 240). In one embodiment, the park assist system 210 may be a manual park assist system that provides indicators to instruct a driver as to how to park the vehicle into the parking area 220. Alternatively, in another embodiment, the park assist system 210 may be an automatic park assist system that controls the steering wheel 234, the accelerator pedal 238, and the brake pedal 240 to automatically steer the vehicle 218 into the parking area 220. Method 400 may then proceed to step 412.

In step 412, once the vehicle 218 is positioned within the parking area 220 and the charging pad 300 is generally aligned with the wireless receiver 302 of the vehicle 218, the safety check is performed to generally ensure no physical obstructions are located between the charging pad 300 and the wireless receiver 302. The park assist control module 230 includes control logic for activating an alert if an obstruction is detected (e.g., an alert visual aid on the display 42 or an audio alert transmitted though the speaker 36). If no obstructions are detected, charging may begin, and method 400 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A park assist system for providing guidance to park a vehicle in a parking area, the park assist system comprising:
   an imaging device that acquires image data representative of a field of view (FOV);
   at least one indicator for providing feedback to guide the vehicle into the parking area; and
   a control module in communication with the imaging device and the at least one indicator, the control module comprising:
      a control logic for monitoring image data representative of the viewable area;
      a control logic for determining if a specific predetermined object is located within the FOV, the specific predetermined object indicating the presence of the parking area, wherein the specific predetermined object is a decal, wherein the decal includes one of a solid color and a quick response code ("QR code") that is readable by the imaging device; and
      a control logic for activating the at least one indicator to provide feedback regarding the parking area.

2. A park assist system for providing guidance to park a vehicle in a parking area, the park assist system comprising:
   an imaging device that acquires image data representative of a field of view (FOV);
   at least one indicator for providing feedback to guide the vehicle into the parking area; and
   a control module in communication with the imaging device and the at least one indicator, the control module comprising:
      a control logic for monitoring image data representative of the viewable area;
      a control logic for determining if a specific predetermined object is located within the FOV, the specific predetermined object indicating the presence of the parking area, wherein the specific predetermined object is a pattern created by a set of headlights of the vehicle that is reflected on a surface; and
      a control logic for activating the at least one indicator to provide feedback regarding the parking area.

3. The park assist system of claim 2, wherein the control module further comprises a control logic for:
   recognizing a distance between a right beam and a left beam of the set of headlights; and
   determining a position of the vehicle relative to the surface based on the distance between the right beam and the left beam.

4. A park assist system for providing guidance to park a vehicle in a parking area, the park assist system comprising:
   an imaging device that acquires image data representative of a field of view (FOV);
   at least one indicator for providing feedback to guide the vehicle into the parking area; and
   a control module in communication with the imaging device and the at least one indicator, the control module comprising:
      a control logic for monitoring image data representative of the viewable area;
      a control logic for determining if a specific predetermined object is located within the FOV, the specific predetermined object indicating the presence of the parking area, wherein the specific predetermined object is a sign that provides an indication that a charging pad is present within the parking area, wherein the sign is located at a predetermined height and a predetermined length from a center of the charging pad;
      a control logic for calculating a fore/aft distance and a lateral positional information of the vehicle relative to the charging pad based on the predetermined height and the predetermined length; and
      a control logic for activating the at least one indicator to provide feedback regarding the parking area.

5. A park assist system for providing guidance to park a vehicle in a parking area, the park assist system comprising:
   an imaging device that acquires image data representative of a field of view (FOV);
   at least one indicator for providing feedback to guide the vehicle into the parking area; and
   a control module in communication with the imaging device and the at least one indicator, the control module comprising:
      a control logic for monitoring image data representative of the viewable area;
      a control logic for determining if a specific predetermined object is located within the FOV, the specific predetermined object indicating the presence of the parking area, wherein the specific predetermined object is a sign that provides an indication that a charging pad is present within the parking area, wherein the sign includes a quick response code ("QR code") that is readable by the imaging device, wherein the QR code indicates at least one of a charging level associated with the charging pad, a commercial source of power associated with the charging pad, and source of power associated with the charging pad; and a control logic for activating the at least one indicator to provide feedback regarding the parking area.

6. A park assist system for providing guidance to park a vehicle in a parking area, the park assist system comprising:
an imaging device that acquires image data representative of a field of view (FOV);
at least one indicator for providing feedback to guide the vehicle into the parking area; and
a control module in communication with the imaging device and the at least one indicator, the control module comprising:
a control logic for monitoring image data representative of the viewable area;
a control logic for determining if a specific predetermined object is located within the FOV, the specific predetermined object indicating the presence of the parking area, wherein the specific predetermined object is a sign that provides an indication that a charging pad is present within the parking area, wherein the park assist system performs a safety check to generally ensure that physical obstructions are not located between the charging pad and a wireless receiver of the vehicle; and
a control logic for activating the at least one indicator to provide feedback regarding the parking area.

* * * * *